US012695721B2

(12) United States Patent
Sajassi et al.

(10) Patent No.: US 12,695,721 B2
(45) Date of Patent: *Jul. 28, 2026

(54) SYNCHRONIZING DYNAMIC HOST CONFIGURATION PROTOCOL SNOOP INFORMATION

(71) Applicant: Cisco Technology, Inc., San Jose, CA (US)

(72) Inventors: Ali Sajassi, Alamo, CA (US); Samir Thoria, Saratoga, CA (US); Lukas Krattiger, Pleasanton, CA (US); Manoj Kumar Pandey, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 18/826,319

(22) Filed: Sep. 6, 2024

(65) Prior Publication Data

US 2024/0430227 A1 Dec. 26, 2024

Related U.S. Application Data

(63) Continuation of application No. 18/172,225, filed on Feb. 21, 2023, now Pat. No. 12,088,552, which is a
(Continued)

(51) Int. Cl.
H04L 61/5053 (2022.01)
H04L 9/40 (2022.01)
(Continued)

(52) U.S. Cl.
CPC ...... H04L 61/5053 (2022.05); H04L 61/5014 (2022.05); H04L 63/0236 (2013.01); H04L 63/101 (2013.01); H04L 2101/622 (2022.05)

(58) Field of Classification Search
CPC ........... H04L 2101/622; H04L 61/5014; H04L 61/5053; H04L 63/0236; H04L 63/101
(Continued)

(56) References Cited

U.S. PATENT DOCUMENTS 7,930,734 B2 4/2011 Foo et al.
8,416,691 B1 4/2013 Haberman et al.
(Continued)

FOREIGN PATENT DOCUMENTS

CN 106254203 12/2016
CN 106357840 A * 1/2017 ........... H04L 61/103
(Continued)

OTHER PUBLICATIONS

Anonymous: "Configuring DHCP Relay and DHCP Snooping together", PICOS 2.10.2 Configuration Guide—PICOS Documentation, Mar. 28, 2018, pp. 1-3, XP093042313, the whole document.
(Continued)

*Primary Examiner* — David P Zarka
(74) *Attorney, Agent, or Firm* — Polsinelli P.C.

(57) ABSTRACT

Systems and techniques are provided for synchronizing DHCP snoop information. In some examples, a method can include, performing, by a first PE device from a plurality of PE devices, DHCP snooping of a first plurality of DHCP messages between a DHCP client and a DHCP server, wherein the plurality of PE devices is part of an ethernet segment for multihoming the DHCP client. In some aspects, the method includes determining, based on snooping the first plurality of DHCP messages, an association between an IP address corresponding to the DHCP client and a MAC address corresponding to the DHCP client. In some examples, the method includes sending, by the first PE device to at least one other PE device from the plurality of PE devices, a first route advertisement that includes the
(Continued)

association between the IP address corresponding to the DHCP client and the MAC address corresponding to the DHCP client.

19 Claims, 8 Drawing Sheets

Related U.S. Application Data continuation of application No. 17/686,797, filed on Mar. 4, 2022, now Pat. No. 11,606,333.

(51) Int. Cl.
 *H04L 61/5014* (2022.01)
 *H04L 101/622* (2022.01)

(58) Field of Classification Search
 USPC ........................................................ 709/245
 See application file for complete search history.

(56) References Cited

U.S. PATENT DOCUMENTS

| | | | | |
|---|---|---|---|---|
| 10,148,550 | B1 | 12/2018 | Murphy et al. | |
| 10,785,114 | B2 * | 9/2020 | Sridhar | H04L 41/0894 |
| 11,606,333 | B1 * | 3/2023 | Sajassi | H04L 61/103 |
| 12,088,552 | B2 * | 9/2024 | Sajassi | H04L 63/0236 |
| 12,113,770 | B2 * | 10/2024 | Pandey | H04L 12/66 |
| 2004/0071164 | A1 | 4/2004 | Baum | |
| 2006/0248229 | A1 | 11/2006 | Saunderson et al. | |
| 2007/0121617 | A1 | 5/2007 | Kanekar et al. | |
| 2007/0256122 | A1 | 11/2007 | Foo et al. | |
| 2007/0288613 | A1 | 12/2007 | Sudame et al. | |
| 2008/0072285 | A1 | 3/2008 | Sankaran et al. | |
| 2009/0210518 | A1 | 8/2009 | Verma et al. | |
| 2009/0285215 | A1 | 11/2009 | Kaippallimalil et al. | |
| 2009/0304008 | A1 | 12/2009 | Kono et al. | |
| 2010/0278183 | A1 | 11/2010 | Gu et al. | |
| 2012/0084840 | A1 * | 4/2012 | Higuchi | H04L 61/5014 |
| | | | | 726/4 |
| 2014/0140244 | A1 | 5/2014 | Kapadia et al. | |
| 2014/0244733 | A1 | 8/2014 | Han et al. | |
| 2015/0100673 | A1 | 4/2015 | Asati et al. | |
| 2017/0163597 | A1 | 6/2017 | Amerneni et al. | |
| 2018/0091445 | A1 | 3/2018 | Singh et al. | |
| 2018/0191573 | A1 * | 7/2018 | Sridhar | H04L 61/5014 |
| 2020/0021555 | A1 * | 1/2020 | Fernando | H04L 12/4633 |
| 2020/0186490 | A1 * | 6/2020 | Bhaskaran | H04L 61/5014 |
| 2021/0099400 | A1 | 4/2021 | Elizabeth et al. | |
| 2021/0160182 | A1 | 5/2021 | Hu | |
| 2021/0211404 | A1 * | 7/2021 | Pandey | H04L 45/028 |

FOREIGN PATENT DOCUMENTS

| | | | | | |
|---|---|---|---|---|---|
| EP | | 3609143 | A1 * | 2/2020 | H04L 45/02 |
| WO | WO-2008131650 | A1 * | 11/2008 | | H04L 61/5014 |

OTHER PUBLICATIONS

International Search Report and Written Opinion for International Application No. PCT/US2023/063507, mailed May 8, 2023, 10 Pages.

Kumar S., et al., "EVPN Access Security draft-surajk-evpn-access-security-00", EVPN Access security, Draft-Surajk-Evpn-Access-Security-00.Txt, Internet Engineering Task Force, IETF, Standard Working Draft, Internet Society (ISOC) 4, Rue Des Falaises CH—1205 Geneva, Switzerland, Jan. 12, 2017, pp. 1-12, [retrieved on Jan. 12, 2017] abstract paragraphs [0001]-[05.1].

Rabadan J., et al., "Usage and Applicability of BGP MPLS-Based Ethernet VPN", Informational, RFC 8388, ISSN: 2070-1721, May 2018, pp. 1-31.

Sajassi A., et al., "BGP MPLS-Based Ethernet VPN," Internet Engineering Task Force (IETF), Request for Comments: 7432, Feb. 2015, pp. 1-56, Retrieved from URL: https://ietf.org.

* cited by examiner

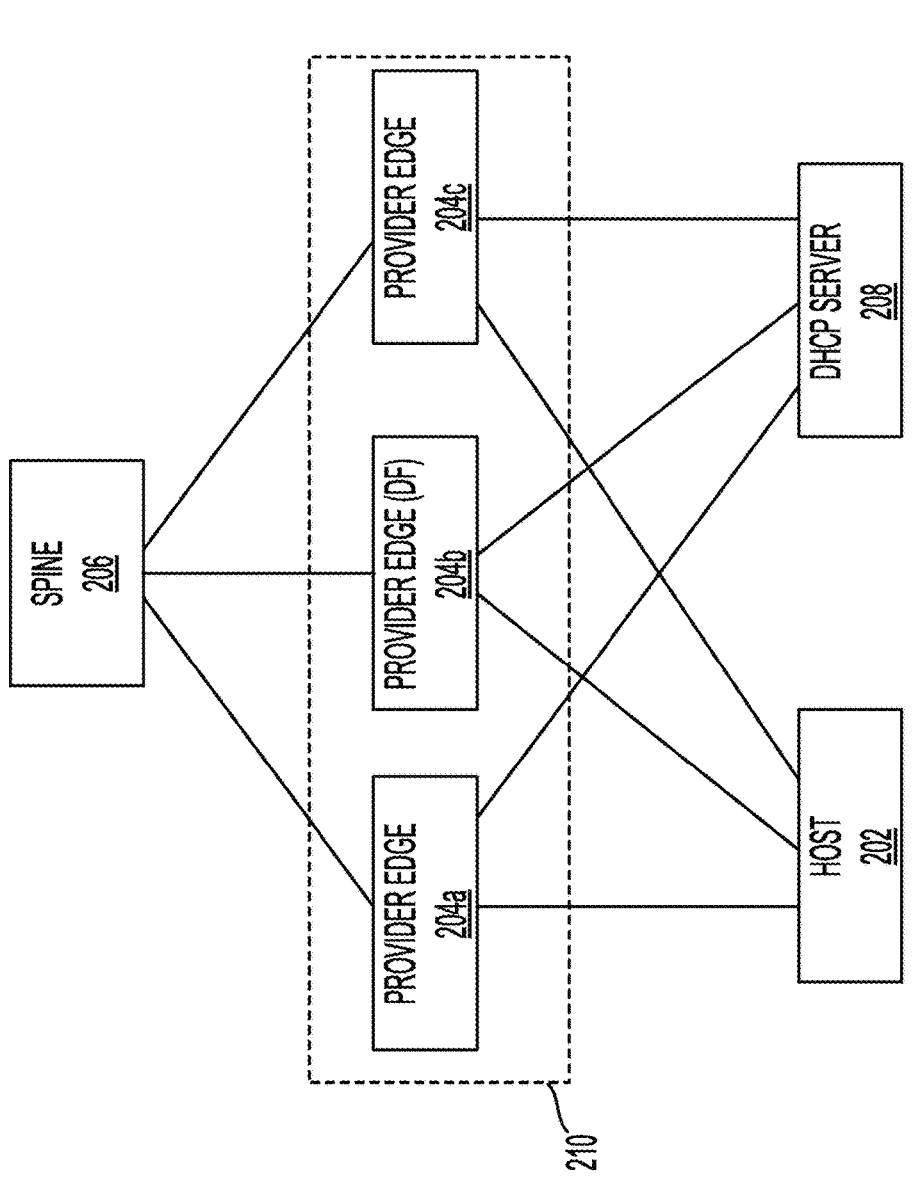
FIG. 2B

500

PERFORM, BY A FIRST PROVIDER EDGE (PE) DEVICE FROM A PLURALITY OF PE DEVICES, DYNAMIC HOST CONFIGURATION PROTOCOL (DHCP) SNOOPING OF A FIRST PLURALITY OF DHCP MESSAGES BETWEEN A DHCP CLIENT AND A DHCP SERVER, WHEREIN THE PLURALITY OF PE DEVICES ARE PART OF AN ETHERNET SEGMENT FOR MULTIHOMING THE DHCP CLIENT — 502

DETERMINE, BASED ON SNOOPING THE FIRST PLURALITY OF DHCP MESSAGES, AN ASSOCIATION BETWEEN AN INTERNET PROTOCOL (IP) ADDRESS CORRESPONDING TO THE DHCP CLIENT AND A MEDIA ACCESS CONTROL (MAC) ADDRESS CORRESPONDING TO THE DHCP CLIENT — 504

SEND, BY THE FIRST PE DEVICE TO AT LEAST ONE OTHER PE DEVICE FROM THE PLURALITY OF PE DEVICES, A FIRST ROUTE ADVERTISEMENT THAT INCLUDES THE ASSOCIATION BETWEEN THE IP ADDRESS CORRESPONDING TO THE DHCP CLIENT AND THE MAC ADDRESS CORRESPONDING TO THE DHCP CLIENT, WHEREIN THE AT LEAST ONE OTHER PE DEVICE IS CONFIGURED TO VALIDATE NETWORK TRAFFIC ASSOCIATED WITH THE DHCP CLIENT — 506

FIG. 5

SYNCHRONIZING DYNAMIC HOST CONFIGURATION PROTOCOL SNOOP INFORMATION

CROSS-REFERENCE TO RELATED APPLICATIONS

This application is a continuation of U.S. patent application Ser. No. 18/172,225, filed on Feb. 21, 2023, which is a continuation of U.S. patent application Ser. No. 17/686,797, filed on Mar. 4, 2022, now issued on Mar. 14, 2023 as U.S. Pat. No. 11,606,333, which are expressly incorporated by reference herein in their entireties.

TECHNICAL FIELD

The subject matter of this disclosure relates in general to the field of computer networking, and more particularly, to systems and methods for synchronizing Dynamic Host Configuration Protocol (DHCP) snoop information.

BACKGROUND

A computer network is a collection of interconnected computing devices that can exchange data and share resources. Example network devices can include layer two (L2) devices (e.g., switches) that can operate in the data link layer and layer three (L3) devices (e.g., routers) that can operate in the network layer. In some examples, an Ethernet Virtual Private Network (EVPN) can be used to extend two or more remote L2 customer networks through an intermediate L3 network (e.g., provider network). In some aspects, the EVPN can transport L2 communications between customer networks via an intermediate network using, for example, Network Virtualization Overlays (NVO) (e.g., Virtual Extensible Local Area Network (VXLAN)), one or more multiprotocol label switching (MPLS) protocols and/or using traffic engineered label switched paths (LSP).

In some cases, a computer network (e.g., an EVPN) may experience an attack that may compromise network security. For instance, a "man-in-the-middle" attack may be used by an attacker to masquerade as a trusted host device in order to gain unauthorized access to network resources. In one example, the masquerading host may direct an Address Resolution Protocol (ARP) packet to a switch device, attempting to trick the switch device into accepting the masquerading host device as a valid host in the network. In another example, a masquerading host device may attempt to use the Internet Protocol (IP) address of another host device to send traffic over a network.

In some cases, a leaf node device may be configured to protect against network security attacks by using First Hop Security (FHS) that may include Dynamic Address Resolution Protocol (ARP) Inspection, IP Source Guard, and/or Dynamic Host Configuration Protocol (DHCP) Snooping. In some examples, such FHS techniques may use a DHCP snoop database to validate network traffic. In some instances, a DHCP snoop database can be used to verify an IP address to Media Access Control (MAC) address pairing of a host device. In some aspects, a leaf node may determine the DHCP snoop database by snooping the DHCP messages between a host device and a DHCP server (e.g., discover, offer, request, acknowledgment (DORA)).

BRIEF DESCRIPTION OF THE DRAWINGS

In order to describe the manner in which the various advantages and features of the disclosure can be obtained, a more detailed description will be rendered by reference to specific embodiments which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 2B is a block diagram illustrating an example system for synchronizing DHCP snoop information, in accordance with some examples;

FIG. 5 is a flowchart illustrating an example method for synchronizing DHCP snoop information, in accordance with some examples;

DESCRIPTION OF EXAMPLE EMBODIMENTS

Figure 1:
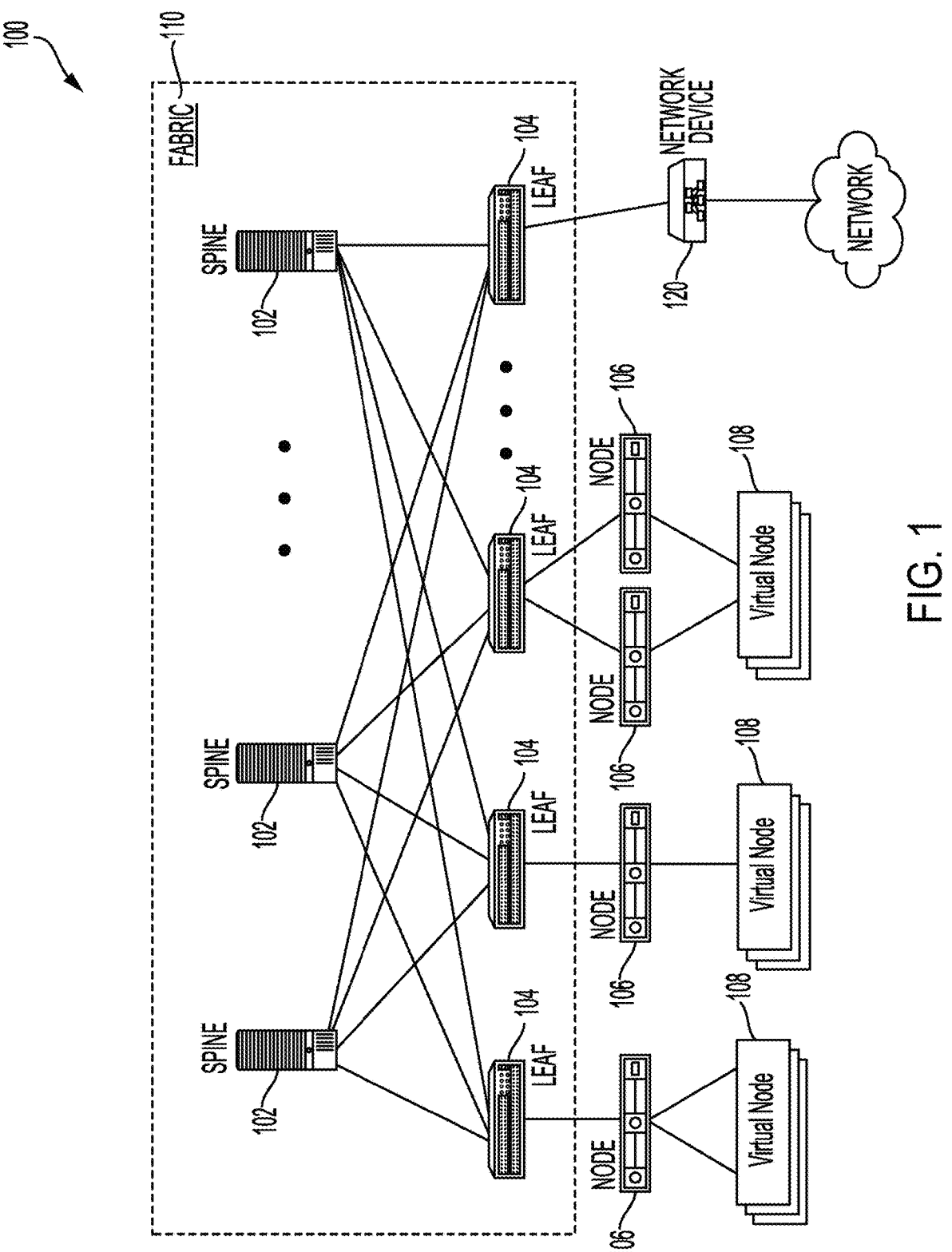
FIG. 1 is a block diagram illustrating an example network architecture, in accordance with some examples.

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

Overview

Disclosed herein are systems, methods, and computer-readable media for synchronizing DHCP snoop information.

According to at least one example, a method for synchronizing DHCP snoop information is provided. The method can include: performing, by a first provider edge (PE) device from a plurality of PE devices, dynamic host configuration protocol (DHCP) snooping of a first plurality of DHCP messages between a DHCP client and a DHCP server, wherein the plurality of PE devices are part of an ethernet segment for multihoming the DHCP client; determining, based on snooping the first plurality of DHCP messages, an association between an internet protocol (IP) address corresponding to the DHCP client and a media access control (MAC) address corresponding to the DHCP client; and sending, by the first PE device to at least one other PE device from the plurality of PE devices, a first route advertisement that includes the association between the IP address corresponding to the DHCP client and the MAC address corresponding to the DHCP client, wherein the at least one other PE device is configured to validate network traffic associated with the DHCP client.

According to at least one example, an apparatus is provided that includes one or more processors and at least one computer-readable storage medium having stored thereon instructions which, when executed by the one or more processors, cause the apparatus to: perform dynamic host configuration protocol (DHCP) snooping of a first plurality of DHCP messages between a DHCP client and a DHCP server, wherein the apparatus is part of an ethernet segment for multihoming the DHCP client; determine, based on snooping the first plurality of DHCP messages, an association between an internet protocol (IP) address corresponding to the DHCP client and a media access control (MAC) address corresponding to the DHCP client; and send, to at least one PE device in the ethernet segment, a first route advertisement that includes the association between the IP address corresponding to the DHCP client and the MAC address corresponding to the DHCP client, wherein the at least one PE device is configured to validate network traffic associated with the DHCP client.

According to at least one example, a non-transitory computer-readable storage medium is provided. The non-transitory computer-readable storage medium can store instructions which, when executed by one or more processors, cause the one or more processors to perform, by a network device, dynamic host configuration protocol (DHCP) snooping of a first plurality of DHCP messages between a DHCP client and a DHCP server, wherein the network device is part of an ethernet segment for multihoming the DHCP client; determine, based on snooping the first plurality of DHCP messages, an association between an internet protocol (IP) address corresponding to the DHCP client and a media access control (MAC) address corresponding to the DHCP client; and send, to at least one PE device in the ethernet segment, a first route advertisement that includes the association between the IP address corresponding to the DHCP client and the MAC address corresponding to the DHCP client, wherein the at least one PE device is configured to validate network traffic associated with the DHCP client.

This overview is not intended to identify key or essential features of the claimed subject matter, nor is it intended to be used in isolation to determine the scope of the claimed subject matter. The subject matter should be understood by reference to appropriate portions of the entire specification of this application, any or all drawings, and each claim.

The foregoing, together with other features and embodiments, will become more apparent upon referring to the following specification, claims, and accompanying drawings.

Example Embodiments

Dynamic Host Configuration Protocol (DHCP) snooping is a technique that can be used to improve network security. DHCP Snooping is based on snooping the DHCP handshake between a host and a DHCP server. The sequence of the handshake consists of four steps, sometimes known as the DORA exchange:

Discover (DHCPDISCOVER): Initial DHCP message sent by the host (or the DHCP client) to discover DHCP server(s) in the network.

Offer (DHCPOFFER): Once a DHCP server receives the Discover message, it responds back with an offer of an IP address that can be assigned to the host.

Request (DHCPREQUEST): Once the host receives one or more of the above offers, it sends request to one of the DHCP servers confirming that it has accepted its offer.

Acknowledge (DHCPACK): The last DHCP message is sent by the DHCP server, for which the Request message was sent to. The message is sent to indicate the completion of the IP assignment mechanism.

In some examples, a DHCP snoop database can be used to store valid Internet Protocol (IP) address to Media Access Control (MAC) address bindings (e.g., IPv4-to-MAC and IPV6-to-MAC bindings) as determined by snooping on DHCP messages. These bindings can be used by security applications like Dynamic ARP Inspection (DAI), Neighbor Discovery Inspection (NDI), IPv4 SourceGuard, and IPv6 Source Guard to safeguard against traffic received with a spoofed address. In some cases, DAI and NDI can use the DHCP Snoop database to validate received ARP messages and/or ND messages. In some examples, IPv4 Source Guard and IPV6 Source Guard can use the DHCP snoop database to validate IPv4 forwarding and/or IPv6 forwarding.

In some cases, a DHCP client can be multihomed and therefore connected to multiple provider edge (PE) devices that are part of the same ethernet segment. In some examples, the DORA exchange (e.g., DHCP handshaking messages) may use multiple PE devices. For example, the DHCP discover message may be sent using a first PE device and the DHCP offer message may be received using a second PE device. In some aspects, the first PE device and the second PE device may not be able to conclude that the DHCP host is secure because neither PE device monitored the entire DORA exchange.

In some embodiments, a PE device that monitors the DORA exchange may determine that the DHCP host is secure. In some aspects, the PE device that monitors the DORA exchange may need to synchronize the DHCP snoop information with neighboring PE devices in the ethernet segment to permit any of the PE devices to validate traffic associated with the DHCP client.

The present technology provides systems and techniques for synchronizing DHCP snoop information for a multihomed DHCP client (e.g., a multihomed DHCP client in an Ethernet Virtual Private Network (EVPN)). In some aspects, a provider edge (PE) device may perform snooping of the DORA exchange and determine that a host device (e.g., DHCP client) is authorized to send traffic via the network. In some cases, the PE device may synchronize the DHCP snoop information by sending a message to one or more other PE devices that are within the same Ethernet Segment (ES), which may also be referred to as Ethernet Segment Identifier (ESI) peers. In some aspects, the message may include an EVPN first hop security (FSH) route. In some examples, the message may include information associated with the DHCP client such as an IP address, a MAC address, and/or an ESI.

FIG. 1 is a block diagram illustrating an example network architecture 100, in accordance with some examples. In some aspects, the network architecture 100 can include a network fabric 110. The network fabric 110 can include and/or represent the physical layer or infrastructure (e.g., underlay) of the network architecture 100. For example, in some cases, the network fabric 110 can represent a data center(s) of one or more networks such as, for example, one or more cloud networks. In this example architecture, the fabric 110 can include spine nodes 102 (e.g., spine switches or routers) and leaf nodes 104 (e.g., leaf switches or routers), which can be interconnected to route or switch traffic in the fabric 110.

The spine nodes 102 can interconnect with the leaf nodes 104 in the fabric 110, and the leaf nodes 104 can connect the fabric 110 to an external network(s), a network overlay(s) and/or logical portion(s) of the network. In some cases, the network overlay(s) and/or logical portion(s) of the network can include, for example, application services, servers, virtual machines, software containers, virtual resources (e.g., storage, memory, CPU, network interfaces, applications, execution environments, etc.), virtual networks, etc.

Network connectivity in the fabric 110 can flow from the spine nodes 102 to the leaf nodes 104, and vice versa. In some cases, the interconnections between the leaf nodes 104 and the spine nodes 102 can be redundant (e.g., multiple interconnections) to avoid a failure in routing. In some examples, the leaf nodes 104 and the spine nodes 102 can be fully connected, such that any given leaf node is connected to each of the spine nodes 102, and any given spine node is connected to each of the leaf nodes 104. Other interconnections between the leaf nodes 104 and the spine nodes 102 are also possible and contemplated herein.

In some cases, the leaf nodes 104 can be, for example, top-of-rack ("ToR") switches, aggregation switches, gateways, ingress and/or egress switches, provider edge devices, and/or any other type of routing or switching device. The leaf nodes 104 can route and/or bridge client/tenant/customer packets to and from other elements, as further described below. In some cases, the leaf nodes 104 can apply network policies or rules to packets. The leaf nodes 104 can connect other elements to the fabric 110. For example, the leaf nodes 104 can connect the server nodes 106, virtual nodes 108 (e.g., virtual machines (VMs), software containers, etc.), network device 120, etc., with the fabric 110. In some examples, one or more of such elements can reside in one or more logical or virtual layers or networks, such as an overlay network. In some cases, the leaf nodes 104 can encapsulate and decapsulate packets to and from such elements in order to enable communications throughout network architecture 100 and/or the fabric 110. The leaf nodes 104 can also provide any other devices, services, tenants, or workloads access to the fabric 110.

In some cases, the server nodes 106 connected to the leaf nodes 104 can encapsulate and decapsulate packets to and from the leaf nodes 104. For example, the server nodes 106 can include one or more virtual switches, routers tunnel endpoints, etc., for tunneling packets between an overlay or logical layer hosted by, or connected to, the server nodes 106 and an underlay layer represented by or included in the fabric 110 and accessed via the leaf nodes 104. The server nodes 106 can include, for example, computing devices, such as physical servers, network devices (e.g., switches, routers, etc.), storage devices, and the like. Moreover, the server nodes 106 can host virtual nodes 108 as further described herein.

In some cases, some or all of the virtual nodes 108 can include software containers, virtual machines, software applications, services, appliances, functions, service chains, etc. For example, one or more of the virtual nodes 108 can include a software container providing an execution environment, a storage service, a firewall service, a message router, a virtual switch, and/or any other application service. One or more applications can be hosted or implemented by one or more software containers corresponding to one or more of the virtual nodes 108 or can be distributed, chained, etc. In some cases, some or all of the virtual nodes 108 can include virtual machines (VMs). VMs can include workloads running on a guest operating system on a respective node. In some cases, a VM (e.g., 108) on a server node (e.g., 106) can be migrated to a different server node (e.g., 106).

In some cases, one or more server nodes 106 and/or virtual nodes 108 can represent or reside in one or more tenant or customer spaces. A tenant or customer space can include workloads, services, applications, devices, networks, networks or routing domains (e.g., virtual routing and forwarding (VRF) domains, bridge domains (BDs), subnets, virtual networks, etc.) and/or resources associated with one or more clients or subscribers. In some examples, traffic in the network architecture 100 can be routed based on specific tenant policies, agreements, configurations, etc. In some cases, addressing can vary between tenants. In some examples, tenant spaces can be divided into logical segments and/or networks and separated from logical segments and/or networks associated with other tenants.

Configurations in the network architecture 100 can be implemented at a logical level, a hardware level (e.g., physical), and/or both. For example, configurations can be implemented at a logical and/or hardware level based on connection attributes, endpoint or resource attributes, etc., such as endpoint types and/or application groups or profiles. In some examples, configurations can be implemented through a software-defined network (SDN), underlay framework and/or overlay framework. Such configurations can define rules, policies, priorities, protocols, attributes, objects, profiles, groups, traffic, security parameters, etc., for routing, processing, and/or classifying traffic in the network architecture 100. For example, configurations can define attributes and objects for classifying and processing traffic based on endpoint groups (EPGs), security groups (SGs), VM types, BDs, VRFs, tenants, priorities, firewall rules, labels, addresses, etc.

The network architecture 100 can deploy different resources (e.g., hosts, applications, services, functions, etc.) via the leaf nodes 104, the server nodes 106, the virtual nodes 108, and/or any other device. The network architecture 100 can interoperate with a variety of server nodes 106 (e.g., physical and/or virtual servers), orchestration platforms, systems, etc. In some cases, the network architecture 100 can implement and/or can be part of one or more cloud networks and can provide cloud computing services such as, for example, cloud storage, software-as-a-service (SaaS) (e.g., collaboration services, email services, enterprise resource planning services, content services, communication services, etc.), infrastructure-as-a-service (IaaS) (e.g., security services, networking services, systems management services, etc.), platform-as-a-service (PaaS) (e.g., web services, streaming services, application development services, etc.), function-as-a-service (FaaS), and/or any other types of services such as desktop-as-a-service (DaaS), information technology management-as-a-service (ITaaS), managed software-as-a-service (MSaaS), mobile backend-as-a-service (MBaaS), etc. In some examples, the network architecture 100 can implement and/or host a serverless computing environment(s), as further described below.

The network architecture 100 described above illustrates a non-limiting example network environment and architecture provided herein for explanation purposes. It should be noted that other network environments and architectures can be implemented in other examples and are also contemplated herein. One of ordinary skill in the art will recognize in view of the disclosure that the technologies and approaches herein can apply to a variety of different network environments and architectures.

Figure 2A:
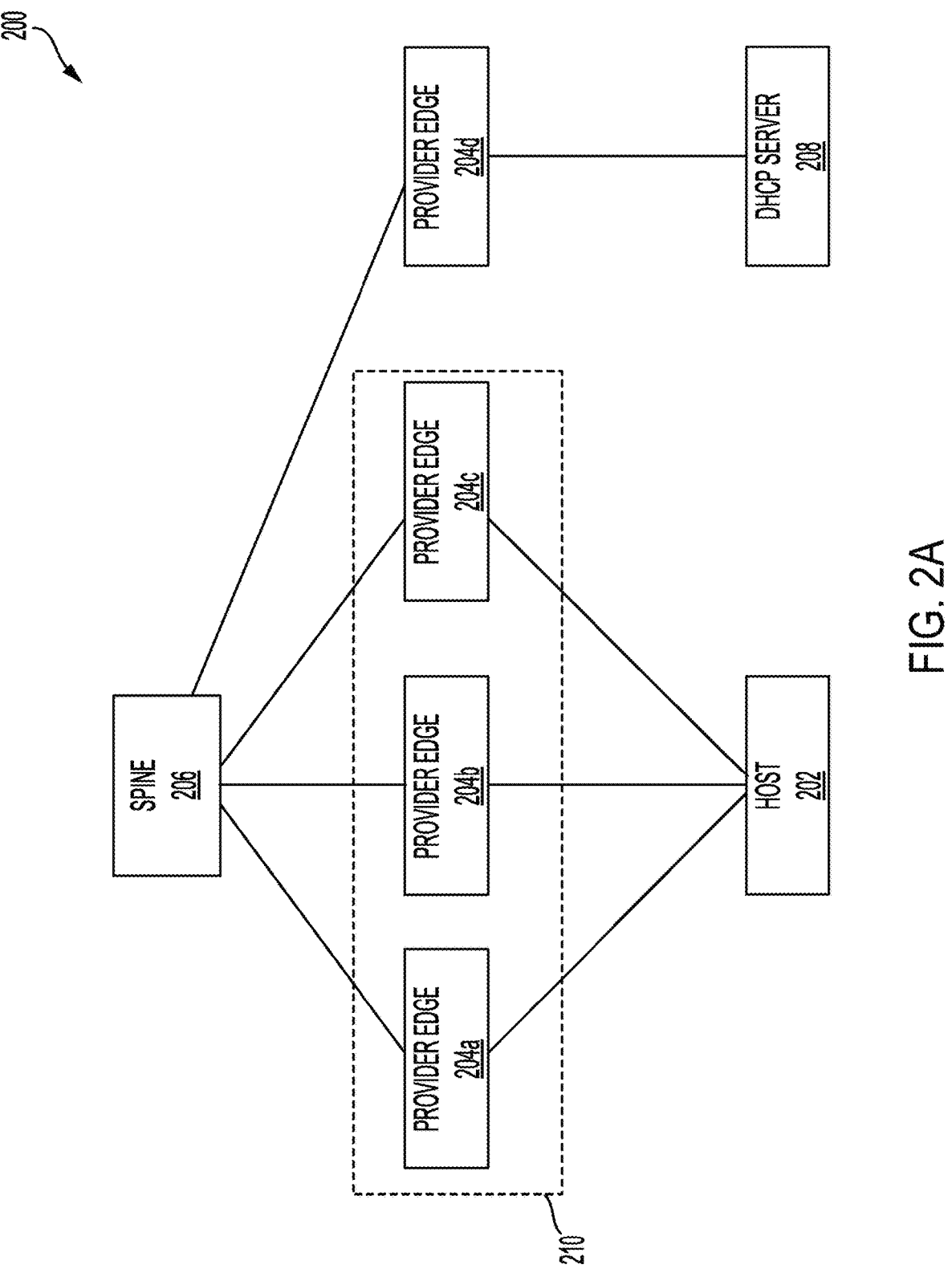
FIG. 2A is a block diagram illustrating an example system for synchronizing Dynamic Host Configuration Protocol (DHCP) snoop information, in accordance with some examples.

FIG. 2A is a block diagram illustrating an example network 200. In some cases, network 200 can correspond to an Ethernet Virtual Private Network (EVPN). In some examples, network 200 can include host 202. In some aspects, host 202 may include any computer or device associated with one or more internet protocol (IP) addresses. For example, host 202 may include a server, a client device, a router (e.g., a customer edge (CE) router), a virtual node (e.g., virtual node 108), and/or any other device that may be configured as a Dynamic Host Configuration Protocol (DHCP) client.

In some cases, network 200 may include one or more provider edge (PE) devices (e.g., EVPN PEs). For example, network 200 can include PE device 204a, PE device 204b, PE device 204c, and PE device 204d (collectively "PE devices 204"). In some instances, PE devices 204 can include leaf nodes (e.g., leaf nodes 104) that can be used to connect with a network fabric (e.g., network fabric 110). In some cases, PE devices 204 may support switching and/or routing functions. In some aspects, PE devices 204 may connect to a network fabric using spine 206. In some aspects, PE device 204a, PE device 204b, and PE device 204c can be part of ethernet segment 210.

In some cases, host 202 can be multihomed by having connections to multiple PE devices. For example, host 202 can be homed or connected (e.g., directly or indirectly) to PE device 204a, PE device 204b, and PE device 204c. In some aspects, in the case of a failure of one of the PE devices that is connected to host 204 (e.g., PE device 204a, PE device 204b, or PE device 204c), the other of the PE devices can be used to provide a backup path for connectivity to host 202.

In some configurations, network 200 may also include Dynamic Host Configuration Protocol (DHCP) server 208. In some aspects, DHCP server 208 may be connected to PE device 204d. In some cases, host 202 may communicate with DHCP server 208 to obtain (e.g., lease) an IP address. In some examples, host 202 and DHCP server 208 may perform a DHCP handshake (e.g., exchange of messages) that may be referred to as a DORA exchange. In some aspects, the DORA exchange may include the following messages:

DISCOVER: in some aspects, the Discover message can correspond to an initial DHCP message sent by host 202 (e.g., DHCP client) to discover DHCP server(s) in network 200.

OFFER: in some cases, DHCP server 208 may respond to the Discover message from host 202 with an Offer message that includes an offer of an IP address that can be assigned to host 202.

REQUEST: in some examples, host 202 may respond to the Offer message from DHCP server 208 with a Request message that can be used to confirm acceptance of the Offer.

ACKNOWLEDGE (Ack): in some instances, DHCP server 208 can send an Ack message to host 202 that indicates the completion of the IP assignment mechanism.

In some aspects, a PE device that is connected to host 202 (e.g., PE device 204a, PE device 204b, or PE device 204c) can be configured to perform DHCP snooping (e.g., monitoring the DORA exchange). In some examples, DHCP snooping is a technique that can be used to improve security of network 200. In some cases, DHCP snooping can be used to create a DHCP snoop database. In some instances, a DHCP snoop database may store valid IP address to media access control (MAC) address pairings corresponding to one or more host devices (e.g., host 202). In some examples, a PE device may store an IP address to MAC address pairing in a DHCP snoop database after snooping (e.g., monitoring) the four messages in the DORA exchange between host 202 and DHCP server 208. In some aspects, a PE device may use the DHCP snoop database to validate packets that originate from host 202 (e.g., a PE device may block or discard packets that do not match an IP to MAC pairing in the DHCP snoop database).

In some cases, each of the PE devices connected to host 202 (e.g., PE device 204a, PE device 204b, or PE device 204c) can be configured as a DHCP relay agent (e.g., a network device that can forward requests and replies between a DHCP server and a DHCP client). For example, host 202 may send a Discover message that can be received by PE device 204a. In some aspects, PE device 204a may forward the Discover message to DHCP server 208. In some examples, DHCP server 208 may send the Offer message to PE device 204a as a unicast message. In some cases, PE device 204a may forward the Offer message to host 202. In some instances, host 202 may send a Request message that can also be received by PE device 204a (e.g., the Discover message and the Request message can hash to same PE device based on similarity of IP header). In some aspects, PE device 204a may forward the Request message to DHCP server 208. In some examples, DHCP server 208 may send the Ack message to PE device 204a as a unicast message. In some aspects, PE device 204a may forward the Ack message to host 202.

In some aspects, PE device 204a may be configured as the DHCP snoop owner based on snooping (e.g., monitoring) of the DORA exchange between host 202 and DHCP server 208. In some examples, PE device 204a may update or populate a DHCP snoop database with an IP address to MAC address pairing corresponding to host 202. In some cases, PE device 204a may send a message to PE device 204b and/or PE device 204c indicating that DHCP snooping was successfully completed. In some examples, the message can include the IP address to MAC address pairing corresponding to host 202. In some instances, the message can include an Ethernet Segment Identifier (ESI) that may correspond to ethernet segment 210.

In some cases, PE device 204b and/or PE device 204c may update a local DHCP snoop database based on the information in the message from PE device 204a (e.g., the IP address to MAC address pairing associated with host 202). In some aspects, the message from PE device 204a can correspond to an Ethernet Virtual Private Network (EVPN) First Hop Security (FHS) route. In some configurations, PE device 204b and/or PE device 204c may determine that the ESI in the EVPN FHS route is same as a locally configured ESI. In some examples, the ESI in the EVPN FHS route matching the locally configured ESI can be used to determine that the DORA exchange was completed for a host that is behind the three ESI peers (e.g., PE device 204*a*, PE device 204*b*, and PE device 204*c*).

In some aspects, DHCP messages may be exchanged between host 202 and DHCP server 208 for renewing a lease of an IP address. In some examples, renewal of an IP address may be performed using a subset of the DORA messages. For instance, host 202 may initiate renewal of an IP address by sending the Request message and DHCP server 208 may respond with the Ack message.

In some cases, host 202 may send the Request message to DHCP server 208 as a unicast message. In some examples, the Request message may hash to a PE device that is not the DHCP snoop owner (e.g., a PE device that did not monitor the DORA exchange). In one illustrative example, the Request message may be received by PE device 204*b* and PE device 204*a* is the DHCP snoop owner. In some configurations in which the PE devices are configured as DHCP relay agents, PE device 204*b* may forward the Request message to DHCP server 208. In some aspects, DHCP server 208 will send an ACK message (e.g., unicast) to PE device 204*b*. In some examples, PE device 204*b* may forward the Ack message to host 202.

In some aspects, PE device 204*b* may become the DHCP snoop owner based on snooping the DCHP renewal message exchange between host 202 and DHCP server 208. In some examples, PE device 204*b* may compare the locally configured ESI with the ESI received from prior DHCP snoop owner (e.g., ESI received as part of EVPN FHS route from PE 204*a*). In some cases, PE device 204*b* may determine (e.g., based on ESI) that the DHCP renewal corresponds to a prior DORA exchange via a different PE device in ethernet segment 210. In some examples, PE device 204*b* may send a EVPN FHS route to PE device 204*a* and/or PE device 204*c*.

FIG. 2B is a block diagram illustrating an example network 200. As noted with respect to FIG. 2A, network 200 may include host 202, PE device 204*a*, PE device 204*b*, PE device 204*c*, spine 206, and DHCP server 208. As illustrated in FIG. 2B, DHCP server 208 may reside in the same Layer-2 segment as host 202 (e.g., the DHCP client). For instance, host 202 and DHCP server 208 may each be multihomed to PE device 204*a*, PE device 204*b*, and PE device 204*c*. In some aspects, PE device 204*a*, PE device 204*b*, and PE device 204*c* may not be configured as DHCP relay agents because DHCP server 208 resides within same Layer 2 segment. In some cases, PE device 204*b* may be configured as the designated forwarder (DF) for traffic to/from host 202 and DHCP server 208.

In some cases, host 202 may initiate the DORA exchange by sending a Discover message that may hash to PE device 204*a*. In some examples, PE device 204*a* may forward the Discover message as a broadcast message (e.g., using an overlay network) towards DHCP server 208. In some aspects, DHCP server 208 may respond with an Offer message that is broadcasted and received by each of the PE devices (e.g., PE device 204*a*, PE device 204*b*, and PE device 204*c*).

In some aspects, each of PE device 204*a*, PE device 204*b*, and PE device 204*c* may evaluate the Offer message to determine whether it is associated with a prior Discover message that was sent by the respective PE device. For example, PE device 204*b* and PE device 204*c* may receive the Offer message and determine that it is not associated with a prior Discover message (e.g., because the Discover message was forwarded by PE device 204*a*). In some examples, PE device 204*b* and PE device 204*c* may ignore the broadcasted Offer message irrespective of DF status (e.g., PE device 204*b* may ignore the broadcasted Offer message although PE device 204*b* is configured as the DF). In some cases, each of the PE devices may evaluate DHCP messages (e.g., broadcasted Offer message) using an Access Control List (ACL).

In some instances, PE device 204*a* may evaluate the broadcasted Offer message and determine that it corresponds to a prior Discover message that was processed (e.g., forwarded) by PE device 204*a*. In some cases, PE device 204*a* may send the Offer message to host 202. In some examples, host 202 may send a Request message to PE device 204*a* (e.g., Request message may hash to same PE device as Discover message). In some cases, PE device 204*a* may forward the Request message as a broadcast message (e.g., using an overlay network) towards DHCP server 208. In some aspects, DHCP server 208 may respond with an Ack message that is broadcasted and received by each of the PE devices (e.g., PE device 204*a*, PE device 204*b*, and PE device 204*c*).

As noted above with respect to the broadcasted Offer message, each of the PE devices may evaluate the broadcasted Ack message (e.g., based on ACL and/or any other device settings) to determine whether to forward the Ack message or discard the Ack message. In some aspects, PE device 204*b* and PE device 204*c* may determine that the Ack message is not associated with any prior DHCP traffic that passed through the respective PE device. In some cases, PE device 204*b* and PE device 204*c* may discard the broadcasted Ack message. In some aspects, PE device 204*a* may evaluate the broadcasted Ack message and determine that it corresponds to prior DHCP traffic (e.g., prior Request message) that was processed (e.g., forwarded) by PE device 204*a*. In some cases, PE device 204*a* may send the Offer message to host 202.

In some aspects, PE device 204*a* may be configured as the DHCP snoop owner based on snooping (e.g., monitoring) of the DORA exchange between host 202 and DHCP server 208. In some examples, PE device 204*a* may update or populate a DHCP snoop database with an IP address to MAC address pairing corresponding to host 202. In some cases, PE device 204*a* may send a message (e.g., EVPN FHS route) to PE device 204*b* and/or PE device 204*c* indicating that DHCP snooping was successfully completed and traffic from host 202 is authorized. As noted above, the message can include information associated with host 202 such as an IP address, a MAC address, an ESI, and/or any other information associated with host 202.

In some examples, host 202 may initiate renewal of an assigned IP address by sending a Request message to DHCP server 208. In some cases, the Request message may be received by any of the PE devices. For example, the Request message may be received by the DHCP snoop owner (e.g., PE device 204*a*). In another example, the Request message may be received by a PE device that is not the DHCP snoop owner (e.g., PE device 204*b* or PE device 204*c*). In some aspects, the PE device that receives the Request message may send a message (e.g., EVPN FHS route) to the other PE devices. In some cases, the message may include an indication (e.g., a flag) that is for synchronizing the Request. In some examples, the message can include ESI import with route target (RT) that can be used to import the route locally.

In some aspects, the Request message can be forwarded to server 208 by the PE device that received the Request message from host 202. In some examples, DHCP server may respond with an Ack message that may be receive by any of the PE devices. In one example, the Ack message may be received by the same PE device that received the Request message. In another example, the Ack message may be received by a PE device that did not receive the Request message but is aware of the DHCP renewal based on the EVPN FHS route received from the PE device that received the Request message. In some instances, the PE device that receives the Ack message can be designated as the DHCP snoop owner (e.g., based on receiving EVPN FHS route or Request message). In some cases, the DHCP snoop owner may send a message (e.g., EVPN FHS route) to other PE devices indicating that snooping of IP address renewal exchange was successfully completed.

In some examples, a PE device (e.g., PE device 204*a*, PE device 204*b*, and/or PE device 204*c*) may receive an address resolution protocol (ARP) message from host 202 prior to a time when the PE device receives the EVPN FHS route. For example, host 202 may receive an ARP message from host 202 prior to receiving EVPN FHS route from the DHCP snoop owner (e.g., PE device 204*a*). In some aspects, PE device 204*b* may store the ARP entry associated with the ARP message with a flag or indication that the ARP entry is being stored for a threshold period of time 'T' (e.g., 2 seconds). In some instances, if a EVPN FHS route arrives within time 'T,' PE device 204*b* may clear the flag and process the ARP entry. In some cases, if a EVPN FHS route is not received within time 'T,' PE device 204*b* may delete the ARP entry.

Figure 3:
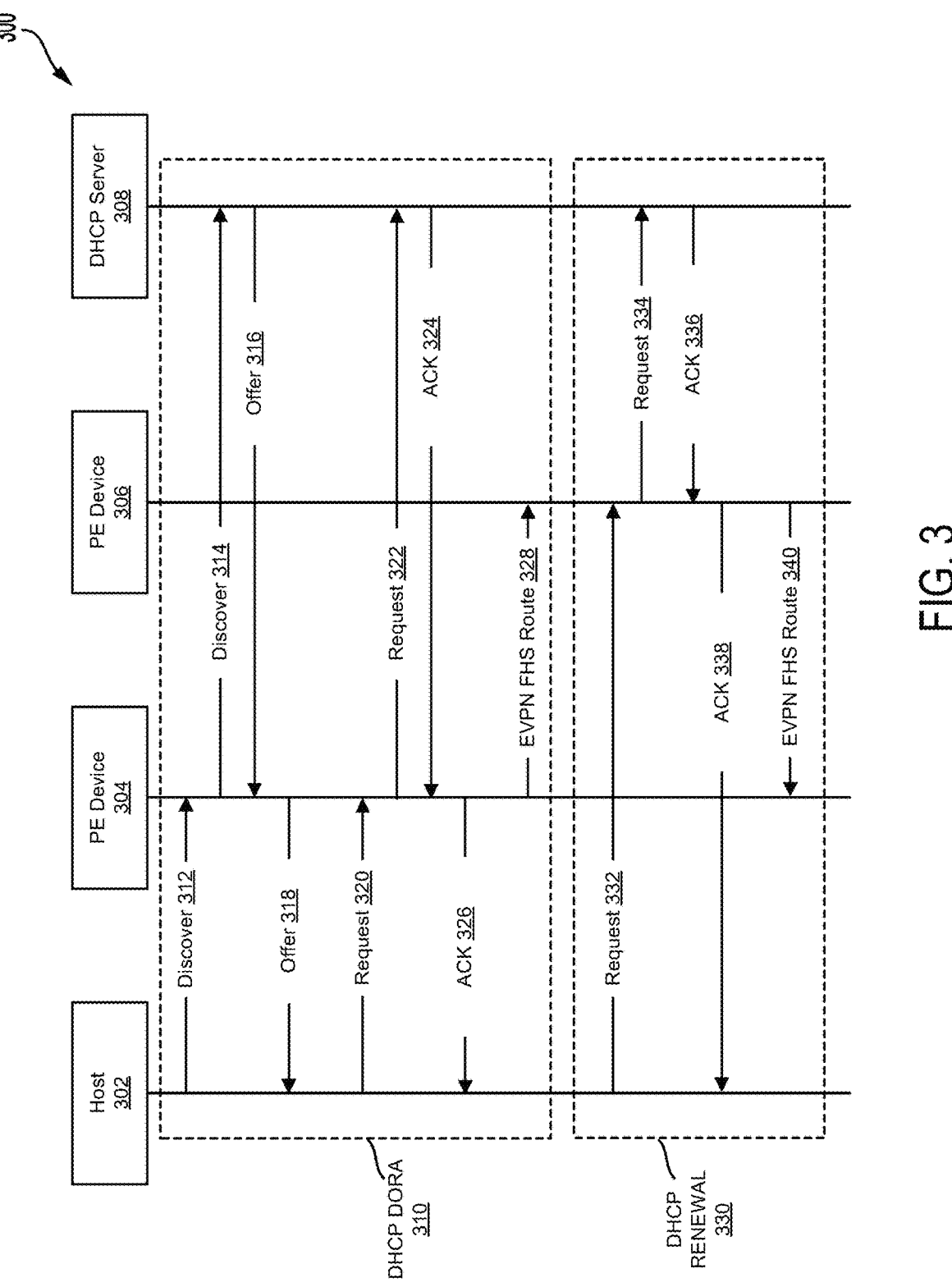
FIG. 3 is a sequence diagram illustrating an example of a sequence for synchronizing DHCP snoop information, in accordance with some examples.

FIG. 3 is a sequence diagram illustrating an example of a sequence 300 for synchronizing Dynamic Host Configuration Protocol (DHCP) snoop information. The sequence 300 may be host 302, provider edge (PE) device 304, PE device 306, and DHCP server 308. In some examples, host 302 can be multihomed to PE device 304 and PE device 306. In some cases, sequence 300 can include a DHCP DORA exchange 310 (e.g., Discover, Offer, Request, and Acknowledgment) for configuring host 302 with an IP address.

At action 312, host 302 can send a Discover message that can be received by PE device 304. At action 314, PE device 304 can forward the Discover message to DHCP server 308. In some examples, PE device 304 and/or PE device 306 can be configured as a DHCP relay agent. At action 316, DHCP server 308 may respond to the Discover message with an Offer message that is sent to PE device 304. At action 318, PE device 304 can forward the Offer message to host 302. At action 320, host 302 can send a Request message that can be received by PE device 304. At action 322, PE device 314 can forward the Request message to DHCP server 308. At action 324, DHCP server 308 may respond to the Request message with an Ack message that is sent to PE device 304. At action 326, PE device 304 can forward the Ack message to host 302.

In some aspects, PE device 304 may be configured as the DHCP snoop owner based on snooping (e.g., observing) the four messages in the DORA exchange. At action 328, PE Device 304 may send a message (e.g., EVPN First Hop Security (FHS) route) to PE device 306. In some examples, the message can be used by PE device 306 to authorize traffic from host 302. In some cases, the message can include data such as IP address, MAC address, ethernet segment identifier (ESI), etc.

In some cases, the sequence 300 may include a DHCP renewal exchange 330 (e.g., Request and Acknowledgment) for host 302 to renew an IP address. At action 332, host 302 may send a Request message to PE device 306 (e.g., not DHCP snoop owner). At action 334, PE device 306 may forward the Request message to DHCP server 308. At action

336, DHCP server 308 can respond with an Ack message. At action 306, PE device 306 may forward the Ack message to host 302.

In some examples, PE device 306 may be configured as DHCP snoop owner based on snooping the renewal messages (e.g., Request and Ack). In some cases, PE device 306 may send a message to PE device 304 indicating that snooping of the DHCP renewal completed successfully. In some cases, the message can include a DHCP EVPN renewal route.

Figure 4:
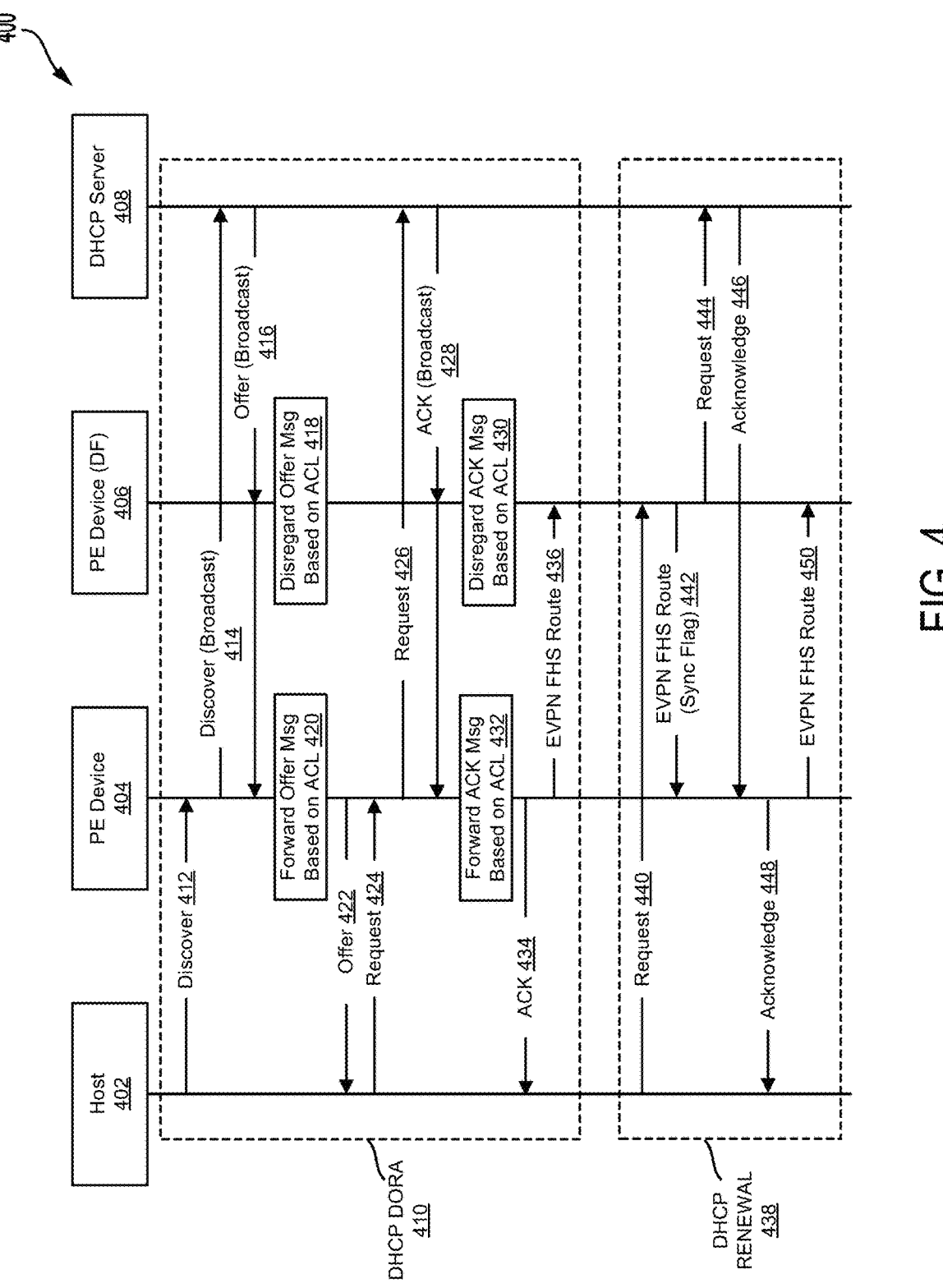
FIG. 4 is a sequence diagram illustrating another example of a sequence for synchronizing DHCP snoop information, in accordance with some examples.

FIG. 4 is a sequence diagram illustrating an example of a sequence 400 for synchronizing Dynamic Host Configuration Protocol (DHCP) snoop information. The sequence 400 may be host 402, provider edge (PE) device 4304, PE device 406, and DHCP server 408. In some examples, host 402 can be multihomed to PE device 404 and PE device 406. In some instances, PE device 406 can be configured as a designated forwarder (DF) for forwarding traffic to host 402 and/or DHCP server 408. In some cases, DHCP server 408 may be part of a same Layer 2 segment as host 202. In some cases, sequence 400 can include a DHCP DORA exchange 410 (e.g., Discover, Offer, Request, and Acknowledgment) for configuring host 302 with an IP address.

At action 412, host 402 can send a Discover message that can be received by PE device 404. At action 414, PE device 404 can forward the Discover message to DHCP server 408. At action 416, DHCP server 408 may respond to the Discover message with an Offer message that is sent as a broadcast message and is received by PE device 404 and PE device 406. At action 418, PE device 406 can evaluate the Offer message and determine that it does not correspond to prior DHCP traffic sent via PE device 406 (e.g., PE device 406 may disregard the Offer message based on an Access Control List (ACL)). In some aspects, PE device 406 may disregard the Offer message irrespective of a designated forwarder (DF) configuration. At action 420, PE device 404 can evaluate the Offer message and determine that it is associated with prior DHCP traffic sent via PE device 404. For example, PE device 404 can determine that the Offer message corresponds to the Discover message that was forwarded by PE device 404 at action 414. At action 422, PE device 404 may forward the Offer message to host 202.

At action 424, host 402 can send a Request message that can be received by PE device 404. At action 4126 PE device 404 can forward the Request message to DHCP server 408. At action 428, DHCP server 408 may respond to the Request message with an Ack message that is sent as a broadcast message and is received by PE device 404 and PE device 406. At action 430, PE device 406 can evaluate the Ack message and determine that it does not correspond to prior DHCP traffic sent via PE device 406 (e.g., PE device 406 may disregard the Ack message). At action 432, PE device 404 can evaluate the Ack message and determine that it is associated with prior DHCP traffic sent via PE device 404. For example, PE device 404 can determine that the Ack message corresponds to the Request message that was forwarded by PE device 404 at action 426. At action 434, PE device 404 may forward the Ack message to host 402.

In some aspects, PE device 404 may be configured as the DHCP snoop owner based on snooping (e.g., observing) the four messages in the DORA exchange. At action 436, PE device 404 may send a message (e.g., EVPN FHS route) to PE device 406. In some examples, the message can be used by PE device 406 to authorize traffic from host 402. As noted above, the message can include data such as IP address, MAC address, ethernet segment identifier (ESI), etc.

In some cases, the sequence 400 may include a DHCP renewal exchange 438 (e.g., Request and Acknowledgment) for host 402 to renew an IP address. At action 440, host 402 may send a Request message to PE device 406 (e.g., not DHCP snoop owner). At action 442, PE device 406 may send an FHS route to PE device 404 that includes a flag for synchronizing the Request message. At action 444, PE device 406 may forward the Request message to DHCP server 408. At action 446, DHCP server 408 can respond with an Ack message that is sent to PE device 404. At action 448, PE device 404 may forward the Ack message to host 402. In some aspects, PE device 404 may be configured as the DHCP snoop owner based on the synchronization of the Request message (e.g., FHS route with sync flag) and the Ack message from DHCP server 408. At action 450, PE device 404 can send a new EVPN FHS route to PE device 406.

FIG. 5 is a flow diagram illustrating an example of a process 500 for synchronizing Dynamic Host Configuration Protocol (DHCP) snoop information. At block 502, the process 500 includes performing, by a first provider edge (PE) device from a plurality of PE devices, dynamic host configuration protocol (DHCP) snooping of a first plurality of DHCP messages between a DHCP client and a DHCP server, wherein the plurality of PE devices is part of an ethernet segment for multihoming the DHCP client. For example, PE device 204a can perform snooping (e.g., monitoring) of DHCP messages included in the DORA exchange (e.g., Discover, Offer, Request, Acknowledgment) between host 202 and DHCP server 208. In some aspects, host 202 can be multihomed to PE device 204a, PE device 204b, and PE device 204c. In some cases, PE device 204a, PE device 204b, and PE device 204c can be part of ethernet segment 210.

In some cases, each of the plurality of PE devices can be configured as a DHCP relay agent. For example, PE device 204a, PE device 204b, and PE device 204c can be configured as a DHCP relay agent that may forward DHCP traffic to/from DHCP server 208.

At block 504, the process 500 includes determining, based on snooping the first plurality of DHCP messages, an association between an internet protocol (IP) address corresponding to the DHCP client and a media access control (MAC) address corresponding to the DHCP client. For instance, PE device 204a can snoop the DORA exchange and determine an association between a MAC address associated with host 202 and an IP address associated with host 202.

At block 506, the process 500 includes sending, by the first PE device to at least one other PE device from the plurality of PE devices, a first route advertisement that includes the association between the IP address corresponding to the DHCP client and the MAC address corresponding to the DHCP client, wherein the at least one other PE device is configured to validate network traffic associated with the DHCP client. For example, PE device 204a can send an Ethernet Virtual Private Network (EVPN) First Hop Security (FHS) route to PE device 204b and/or PE device 204c. In some aspects, PE device 204b and PE device 204c can be configured to validate network traffic associated with host 202 (e.g., based on the EVPN FHS route).

In some aspects, the process 500 may include receiving, by the first PE device, a DHCP offer message broadcasted by the DHCP server to the plurality of PE devices, wherein the DHCP offer message is directed to the DHCP client. For example, PE device 204a may receive a DHCP offer message directed to host 202 that is broadcasted by DHCP server 208 to PE device 204a, PE device 204b, and PE device 204c. In some cases, the process 500 can include determining, by the first PE device, that the DHCP offer message corresponds to a DHCP discover message forwarded by the first PE device from the DHCP client to the DHCP server. For instance, PE device 204a may determine that the broadcasted offer message corresponds to a discover message that was forwarded from host 202 to DHCP server 208 by PE device 204a.

In some cases, the plurality of PE devices can be configured with an access control list (ACL) for evaluating the DHCP messages. For example, PE device 204a may use an ACL to determine that the broadcasted offer message corresponds to the discover message.

In some instances, the process 500 can include sending, by the first PE device, the DHCP offer message to the DHCP client. For example, PE device 204a can forward the broadcasted offer message to host 202.

In some cases, the process 500 can include receiving, by the first PE device from the at least one other PE device from the plurality of PE devices, a second route advertisement that includes the association between the IP address corresponding to the DHCP client and the MAC address corresponding to the DHCP client. For example, PE device 204a can receive a second route advertisement from PE device 204b that is associated with an IP address renewal (e.g., DHCP renewal messages snooped by PE device 204b). In some examples, the at least one other PE device can be configured to perform snooping of a second plurality of DHCP messages, wherein the second plurality of DHCP messages are associated with a lease renewal of the IP address corresponding to the DHCP client. For example, PE device 204b can be configured to monitor a Request message and an Ack message associated with renewal of an IP address assigned to host 202.

In some aspects, the method 500 can include receiving, by the first PE device, a DHCP request message from the DHCP client, wherein the DHCP request message is associated with a lease renewal of the IP address corresponding to the DHCP client and sending, by the first PE device to the at least one other PE device, a third route advertisement that includes the association between the IP address corresponding to the DHCP client and the MAC address corresponding to the DHCP client, wherein the third route advertisement further includes an indication for synchronizing the DHCP request message among the first PE device and the at least one other PE device. For example, PE device 304a can receive a DHCP request message from host 202 for renewal of an IP address lease. In some cases, PE device 304a can send a route advertisement to PE device 304b and PE device 304c that includes an indication (e.g., flag) for synchronizing the DHCP request message among the PE devices.

Figure 6:
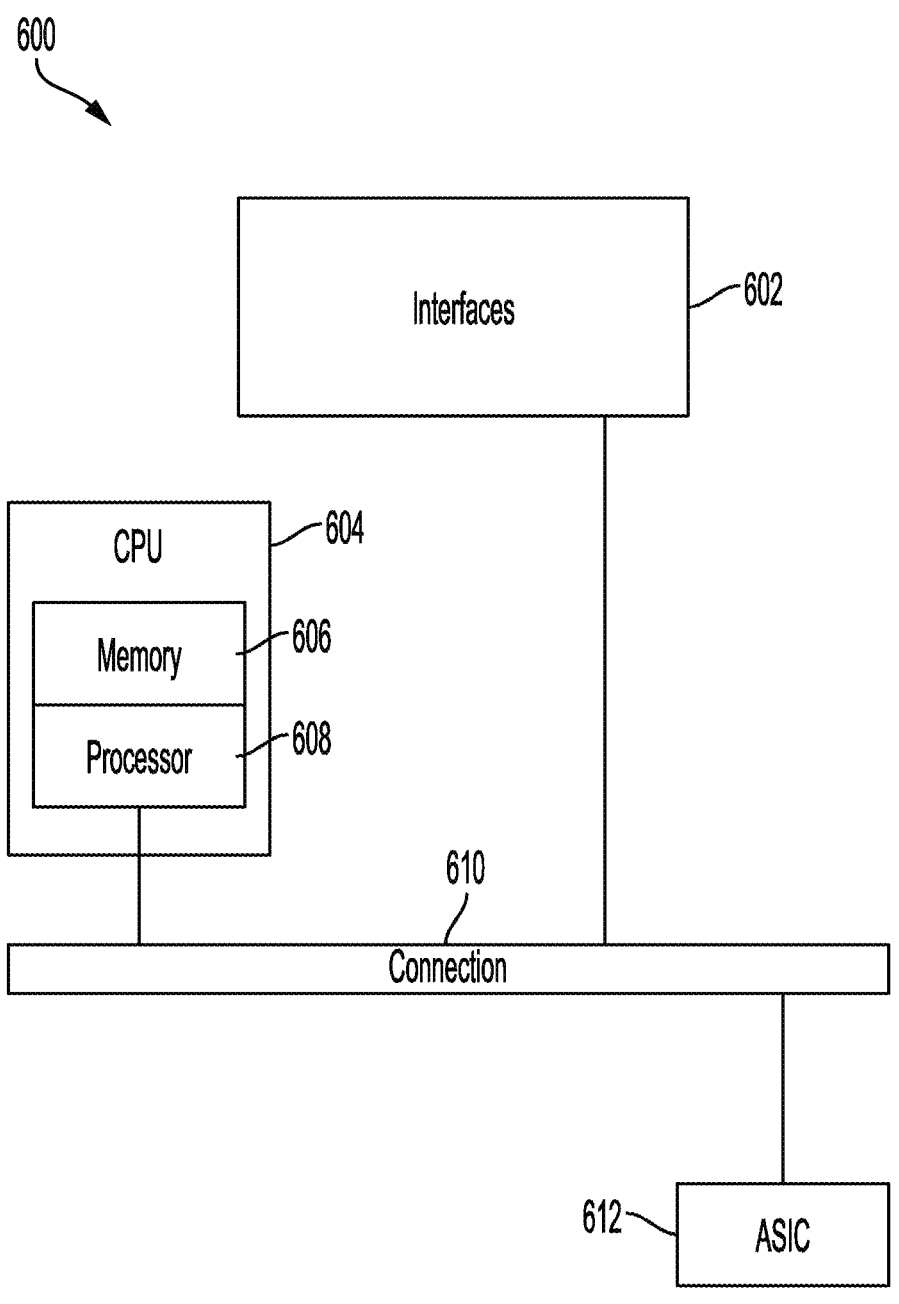
FIG. 6 illustrates an example network device, in accordance with some examples.
Figure 7:
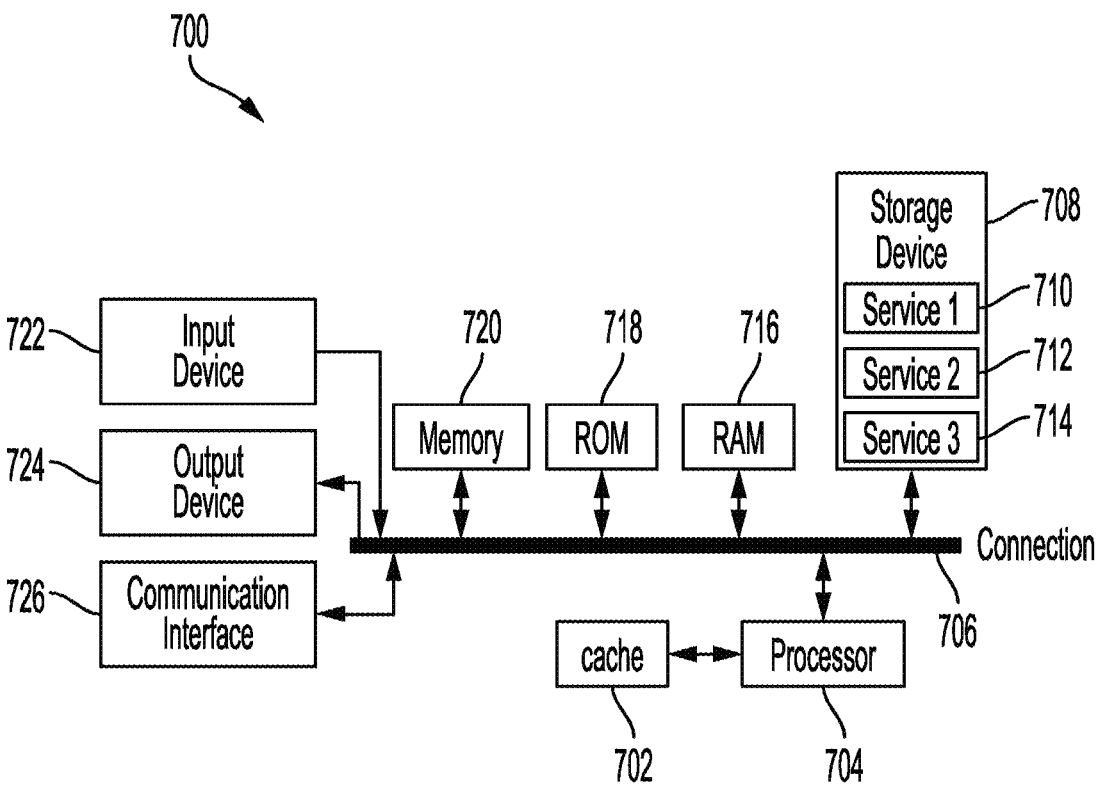
FIG. 7 illustrates an example computing device, in accordance with some examples.

The disclosure now turns to FIGS. 6 and 7, which illustrate example network devices and computing devices, such as switches, routers, nodes, servers, client devices, orchestrators, and so forth.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LORA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 604) to efficiently perform routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

FIG. 7 illustrates an example computing system architecture of a system 700 which can be used to process FaaS operations and requests, deploying execution environments, loading code associated with FaaS functions, and perform any other computing operations described herein. In this example, the components of the system 700 are in electrical communication with each other using a connection 706, such as a bus. The system 700 includes a processing unit (CPU or processor) 704 and a connection 706 that couples various system components including a memory 720, such as read only memory (ROM) 718 and random access memory (RAM) 716, to the processor 704.

The system 700 can include a cache of high-speed memory connected directly with, in close proximity to, or integrated as part of the processor 704. The system 700 can copy data from the memory 720 and/or the storage device 708 to cache 702 for quick access by the processor 704. In this way, the cache can provide a performance boost that avoids processor 704 delays while waiting for data. These and other modules can control or be configured to control the processor 704 to perform various actions. Other memory 720 may be available for use as well. The memory 720 can include multiple different types of memory with different performance characteristics. The processor 704 can include any general purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing system 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 716, read only memory (ROM) 718, and hybrids thereof.

The storage device 708 can include services 710, 712, 714 for controlling the processor 704. Other hardware or software modules are contemplated. The storage device 708 can be connected to the connection 706. In one aspect, a hardware module that performs a particular function can include the software component stored in a computer-readable medium in connection with the necessary hardware components, such as the processor 704, connection 706, output device 724, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
performing, by a first provider edge device (first PE device) from a plurality of PE devices, dynamic host configuration protocol snooping (DHCP snooping) between a DHCP client and a DHCP server, wherein the DHCP snooping comprises:
  receiving, by the first PE device, a first message broadcasted by the DHCP server to the plurality of PE devices, wherein the first message is directed to the DHCP client;
  determining, by the first PE device, that the first message corresponds to a second message forwarded by the first PE device from the DHCP client to the DHCP server; and
  sending, by the first PE device, the first message to the DHCP client;

determining, based on the DHCP snooping, that the DHCP client is secure;
sending, by the first PE device to at least one other PE device, a first route advertisement that includes an indication; and
configuring the at least one other PE device to validate network traffic associated with the DHCP client based on the indication.

2. The method of claim 1, wherein each of the plurality of PE devices is configured as a DHCP relay agent.

3. The method of claim 1, wherein the plurality of PE devices is configured with an access control list (ACL) for evaluating DHCP messages.

4. The method of claim 1, further comprising:
receiving, by the first PE device from the at least one other PE device from the plurality of PE devices, a second route advertisement that includes an association between an internet protocol address (IP address) corresponding to the DHCP client and a media access control address (MAC address) corresponding to the DHCP client.

5. The method of claim 4, wherein the at least one other PE device is configured to perform snooping of a second plurality of DHCP messages, wherein the second plurality of DHCP messages are associated with a lease renewal of the IP address corresponding to the DHCP client.

6. The method of claim 4, further comprising:
receiving, by the first PE device, a DHCP request message from the DHCP client, wherein the DHCP request message is associated with a lease renewal of the IP address corresponding to the DHCP client; and
sending, by the first PE device to the at least one other PE device, a third route advertisement that includes the association between the IP address corresponding to the DHCP client and the MAC address corresponding to the DHCP client, wherein the third route advertisement further includes an indication for synchronizing the DHCP request message among the first PE device and the at least one other PE device.

7. An apparatus comprising:
a processor for executing instructions stored in memory, wherein execution of the instructions by the processor executes:
performing, by a first provider edge device (first PE device) from a plurality of PE devices, dynamic host configuration protocol snooping (DHCP snooping) between a DHCP client and a DHCP server, wherein the DHCP snooping comprises:
  receiving, by the first PE device, a first message broadcasted by the DHCP server to the plurality of PE devices, wherein the first message is directed to the DHCP client;
  determining, by the first PE device, that the first message corresponds to a second message forwarded by the first PE device from the DHCP client to the DHCP server; and
  sending, by the first PE device, the first message to the DHCP client;
determining, based on the DHCP snooping, that the DHCP client is secure;
sending, by the first PE device to at least one other PE device, a first route advertisement that includes an indication; and
configuring the at least one other PE device to validate network traffic associated with the DHCP client based on the indication.

8. The apparatus of claim 7, wherein each of the plurality of PE devices is configured as a DHCP relay agent.

9. The apparatus of claim 7, wherein the plurality of PE devices is configured with an access control list (ACL) for evaluating DHCP messages.

10. The apparatus of claim 7, further comprising:

receiving, by the first PE device from the at least one other PE device from the plurality of PE devices, a second route advertisement that includes an association between an internet protocol address (IP address) corresponding to the DHCP client and a media access control address (MAC address) corresponding to the DHCP client.

11. The apparatus of claim 10, wherein the at least one other PE device is configured to perform snooping of a second plurality of DHCP messages, wherein the second plurality of DHCP messages are associated with a lease renewal of the IP address corresponding to the DHCP client.

12. The apparatus of claim 10, further comprising:

receiving, by the first PE device, a DHCP request message from the DHCP client, wherein the DHCP request message is associated with a lease renewal of the IP address corresponding to the DHCP client; and sending, by the first PE device to the at least one other PE device, a third route advertisement that includes the association between the IP address corresponding to the DHCP client and the MAC address corresponding to the DHCP client, wherein the third route advertisement further includes an indication for synchronizing the DHCP request message among the first PE device and the at least one other PE device.

13. The apparatus of claim 7, wherein the first message and the second message are an offer message and a discover message, respectively.

14. A non-transitory computer readable medium comprising instructions, the instructions, when executed by a computing system, cause the computing system to:

performing, by a first provider edge device (first PE device) from a plurality of PE devices, dynamic host configuration protocol snooping (DHCP snooping) between a DHCP client and a DHCP server, wherein the DHCP snooping comprises:

receiving, by the first PE device, a first message broadcasted by the DHCP server to the plurality of PE devices, wherein the first message is directed to the DHCP client;

determining, by the first PE device, that the first message corresponds to a second message forwarded by the first PE device from the DHCP client to the DHCP server; and sending, by the first PE device, the first message to the DHCP client;

determining, based on the DHCP snooping, that the DHCP client is secure;

sending, by the first PE device to at least one other PE device, a first route advertisement that includes an indication; and configuring the at least one other PE device to validate network traffic associated with the DHCP client based on the indication.

15. The non-transitory computer readable medium of claim 14, wherein each of the plurality of PE devices is configured as a DHCP relay agent.

16. The non-transitory computer readable medium of claim 14, wherein the plurality of PE devices is configured with an access control list (ACL) for evaluating DHCP messages.

17. The non-transitory computer readable medium of claim 14, the instructions further causing the computing system to:

receive, by the first PE device from the at least one other PE device from the plurality of PE devices, a second route advertisement that includes an association between an internet protocol address (IP address) corresponding to the DHCP client and a media access control address (MAC address) corresponding to the DHCP client.

18. The non-transitory computer readable medium of claim 17, wherein the at least one other PE device is configured to perform snooping of a second plurality of DHCP messages, wherein the second plurality of DHCP messages are associated with a lease renewal of the IP address corresponding to the DHCP client.

19. The non-transitory computer readable medium of claim 17, the instructions further causing the computing system to:

receive, by the first PE device, a DHCP request message from the DHCP client, wherein the DHCP request message is associated with a lease renewal of the IP address corresponding to the DHCP client; and send, by the first PE device to the at least one other PE device, a third route advertisement that includes the association between the IP address corresponding to the DHCP client and the MAC address corresponding to the DHCP client, wherein the third route advertisement further includes an indication for synchronizing the DHCP request message among the first PE device and the at least one other PE device.

* * * * *